(12) United States Patent
Landis et al.

(10) Patent No.: US 11,677,609 B2
(45) Date of Patent: Jun. 13, 2023

(54) SIGNALING OF A NON-LINEARITY MODEL

(71) Applicant: QUALCOMM Incorporated, San Diego, CA (US)

(72) Inventors: Shay Landis, Hod Hasharon (IL); Amit Bar-Or Tillinger, Tel-Aviv (IL); Idan Michael Horn, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 159 days.

(21) Appl. No.: 17/302,288

(22) Filed: Apr. 29, 2021

(65) Prior Publication Data

US 2022/0353850 A1 Nov. 3, 2022

(51) Int. Cl.

| H04L 27/34 | (2006.01) |
|---|---|
| H04L 1/00 | (2006.01) |
| G06N 7/08 | (2006.01) |
| H04W 24/02 | (2009.01) |
| H04W 72/51 | (2023.01) |
| H04L 5/00 | (2006.01) |
| H04L 27/02 | (2006.01) |
| H04W 72/23 | (2023.01) |
| H04L 1/06 | (2006.01) |
| H04B 7/0413 | (2017.01) |

(52) U.S. Cl.
CPC ........... *H04L 27/3405* (2013.01); *G06N 7/08* (2013.01); *H04L 1/0015* (2013.01); *H04L 1/0042* (2013.01); *H04L 1/0075* (2013.01); *H04L 5/0005* (2013.01); *H04L 27/02* (2013.01); *H04W 24/02* (2013.01); *H04W 72/23* (2023.01); *H04W 72/51* (2023.01); *H04B 7/0413* (2013.01); *H04L 1/0668* (2013.01); *H04L 5/0007* (2013.01)

(58) Field of Classification Search
CPC ... H04L 27/02; H04L 37/3405; H04L 1/0015; H04L 1/0042; H04L 1/0075; H04L 1/0668; H04L 5/0005; H04L 5/0007; H04L 5/12; G06N 7/08; H04W 72/042; H04W 24/02; H04B 7/0413
See application file for complete search history.

(56) References Cited

U.S. PATENT DOCUMENTS

| 7,263,144 B2 | 8/2007 | Sasson et al. |
| 9,553,754 B1* | 1/2017 | Dorosenco .......... H04L 27/3863 |
| 11,038,739 B1* | 6/2021 | Landis ................. H04B 1/1027 |
| 2003/0016741 A1* | 1/2003 | Sasson .................... H04L 27/38 375/229 |
| 2011/0312290 A1* | 12/2011 | Beeler ................ H04B 7/18513 455/295 |

(Continued)

FOREIGN PATENT DOCUMENTS

CN 105743630 B 9/2019

OTHER PUBLICATIONS

International Search Report and Written Opinion—PCT/US2022/071471—ISA/EPO—dated Jul. 25, 2022.

*Primary Examiner* — Joshua Kading
(74) *Attorney, Agent, or Firm* — Harrity & Harrity

(57) ABSTRACT

Various aspects of the present disclosure generally relate to wireless communication. In some aspects, a user equipment (UE) may receive an indication of a non-linearity model associated with one or more downlink communications. The UE may receive the one or more downlink communications based at least in part on the non-linearity model. Numerous other aspects are described.

30 Claims, 8 Drawing Sheets

(56) References Cited

U.S. PATENT DOCUMENTS

| | | | |
|---|---|---|---|
| 2012/0119811 A1* | 5/2012 | Bai | H03F 1/3252 |
| | | | 327/317 |
| 2013/0200951 A1* | 8/2013 | Irvine | H03F 1/3247 |
| | | | 330/149 |
| 2014/0098915 A1* | 4/2014 | Eliaz | H04L 7/042 |
| | | | 375/348 |
| 2015/0049843 A1* | 2/2015 | Reuven | H04B 1/0475 |
| | | | 375/296 |
| 2015/0270856 A1* | 9/2015 | Breynaert | H04B 7/18515 |
| | | | 375/296 |
| 2015/0311926 A1* | 10/2015 | Eliaz | H04B 1/3833 |
| | | | 375/297 |
| 2016/0065329 A1* | 3/2016 | Stopler | H04L 25/067 |
| | | | 714/776 |
| 2016/0285668 A1* | 9/2016 | Yaman | H04L 27/3444 |
| 2017/0288935 A1* | 10/2017 | Montorsi | H04B 1/02 |
| 2019/0028131 A1* | 1/2019 | Wang | H04B 1/10 |
| 2021/0067215 A1* | 3/2021 | Song | H04B 7/0632 |
| 2022/0182105 A1* | 6/2022 | Ota | H04B 1/7107 |

* cited by examiner

SIGNALING OF A NON-LINEARITY MODEL

FIELD OF THE DISCLOSURE

Aspects of the present disclosure generally relate to wireless communication and to techniques and apparatuses for signaling of a non-linearity model.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

SUMMARY

Figure 1:
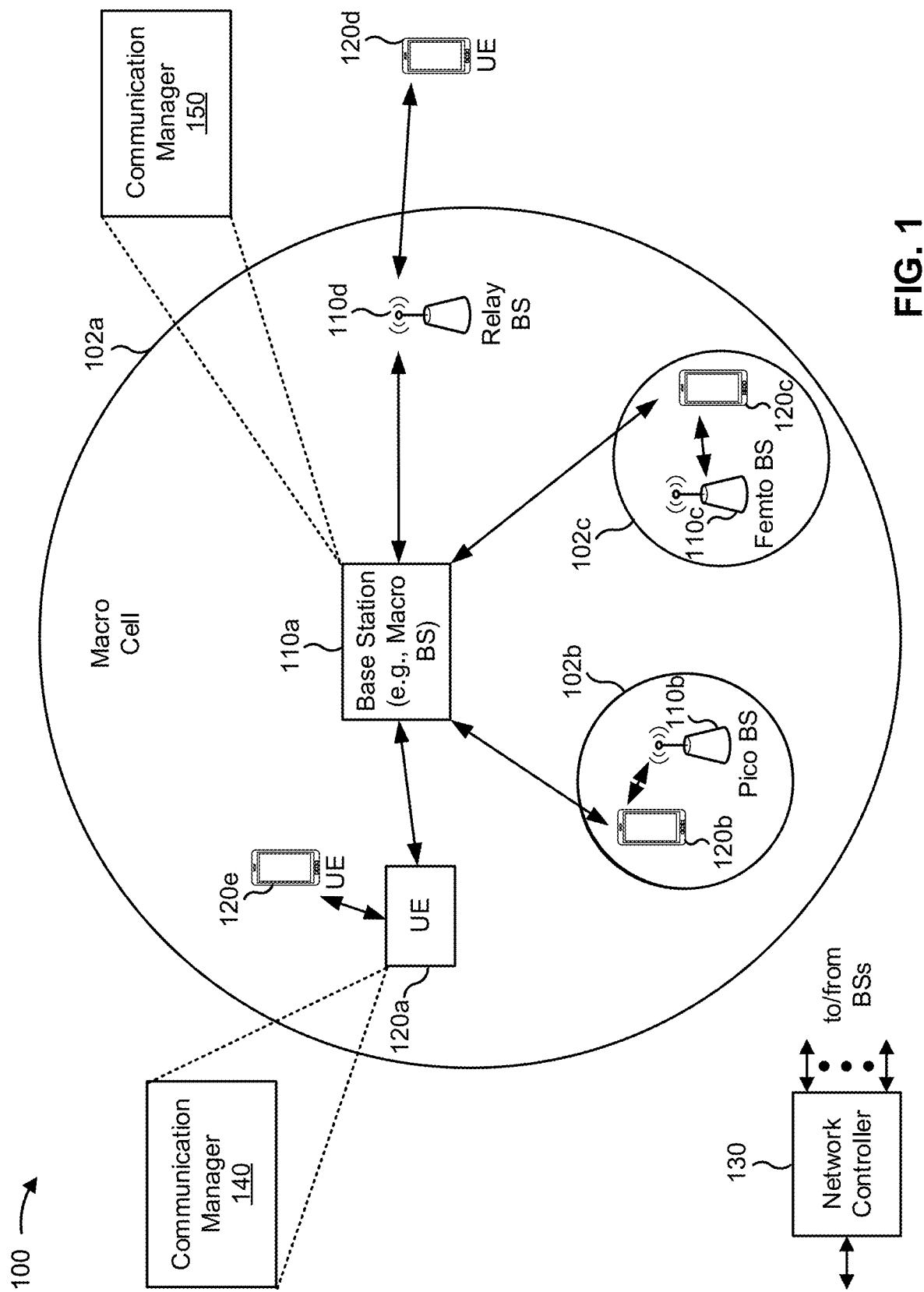
FIG. 1 is a diagram illustrating an example of a wireless network, in accordance with the present disclosure.

In some aspects, a method of wireless communication performed by a user equipment (UE) includes receiving an indication of a non-linearity model associated with one or more downlink communications; and receiving the one or more downlink communications based at least in part on the non-linearity model.

In some aspects, a method of wireless communication performed by a base station includes transmitting an indication of a non-linearity model associated with one or more downlink communications; and transmitting the one or more downlink communications based at least in part on the non-linearity model.

In some aspects, a UE for wireless communication includes a memory; and one or more processors, coupled to the memory, configured to: receive an indication of a non-linearity model associated with one or more downlink communications; and receive the one or more downlink communications based at least in part on the non-linearity model.

In some aspects, a base station for wireless communication includes a memory; and one or more processors, coupled to the memory, configured to: transmit an indication of a non-linearity model associated with one or more downlink communications; and transmit the one or more downlink communications based at least in part on the non-linearity model.

In some aspects, a non-transitory computer-readable medium storing a set of instructions for wireless communication includes one or more instructions that, when executed by one or more processors of a UE, cause the UE to: receive an indication of a non-linearity model associated with one or more downlink communications; and receive the one or more downlink communications based at least in part on the non-linearity model.

In some aspects, a non-transitory computer-readable medium storing a set of instructions for wireless communication includes one or more instructions that, when executed by one or more processors of a base station, cause the base station to: transmit an indication of a non-linearity model associated with one or more downlink communications; and transmit the one or more downlink communications based at least in part on the non-linearity model.

In some aspects, an apparatus for wireless communication includes means for receiving an indication of a non-linearity model associated with one or more downlink communications; and means for receiving the one or more downlink communications based at least in part on the non-linearity model.

In some aspects, an apparatus for wireless communication includes means for transmitting an indication of a non-linearity model associated with one or more downlink communications; and means for transmitting the one or more downlink communications based at least in part on the non-linearity model.

Aspects generally include a method, apparatus, system, computer program product, non-transitory computer-readable medium, user equipment, base station, wireless communication device, and/or processing system as substantially described herein with reference to and as illustrated by the drawings and specification The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antenna, radio frequency (RF) chains, power amplifiers, modulators, buffer, processor(s), interleaver, adders, or summers). It is intended that aspects described herein may be practiced in a wide variety of devices, components, systems, distributed arrangements, or end-user devices of varying size, shape, and constitution.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment. UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some aspects, the UE 120 may include a communication manager 140. As described in more detail elsewhere herein, the communication manager 140 may receive an indication of a non-linearity model associated with one or more downlink communications; and receive the one or more downlink communications based at least in part on the non-linearity model. Additionally, or alternatively, the communication manager 140 may perform one or more other operations described herein.

In some aspects, the base station 110 may include a communication manager 150. As described in more detail elsewhere herein, the communication manager 150 may transmit an indication of a non-linearity model associated with one or more downlink communications; and transmit the one or more downlink communications based at least in part on the non-linearity model. Additionally, or alternatively, the communication manager 150 may perform one or more other operations described herein.

As indicated above, FIG. 1 is provided as an example. Other examples may differ from what is described with regard to FIG. 1.

Figure 2:
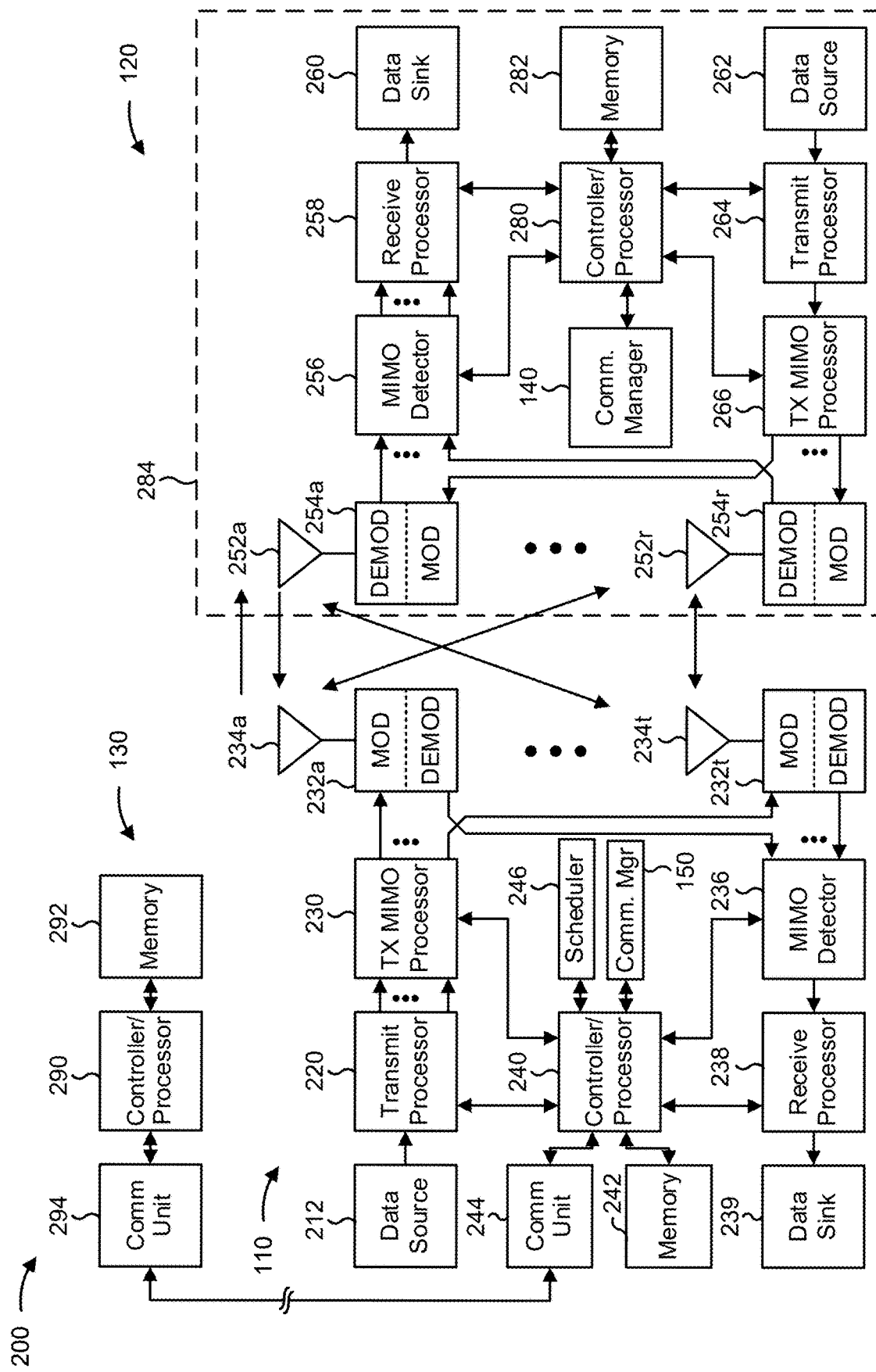
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 4-6.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 4-6.

Controller/processor 240 of base station 110, controller/processor 280 of UE 120, and/or any other component(s) of FIG. 2 may perform one or more techniques associated with signaling of a non-linearity model, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, and/or other processes as described herein. In some aspects, executing instructions may include miming the instructions, converting the instructions, compiling the instructions, and/or interpreting the instructions, among other examples.

In some aspects, the UE includes means for receiving an indication of a non-linearity model associated with one or more downlink communications; and/or means for receiving the one or more downlink communications based at least in part on the non-linearity model. The means for the UE to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

In some aspects, the base station includes means for transmitting an indication of a non-linearity model associated with one or more downlink communications; and/or means for transmitting the one or more downlink communications based at least in part on the non-linearity model. The means for the base station to perform operations described herein may include, for example, one or more of communication manager 150, transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
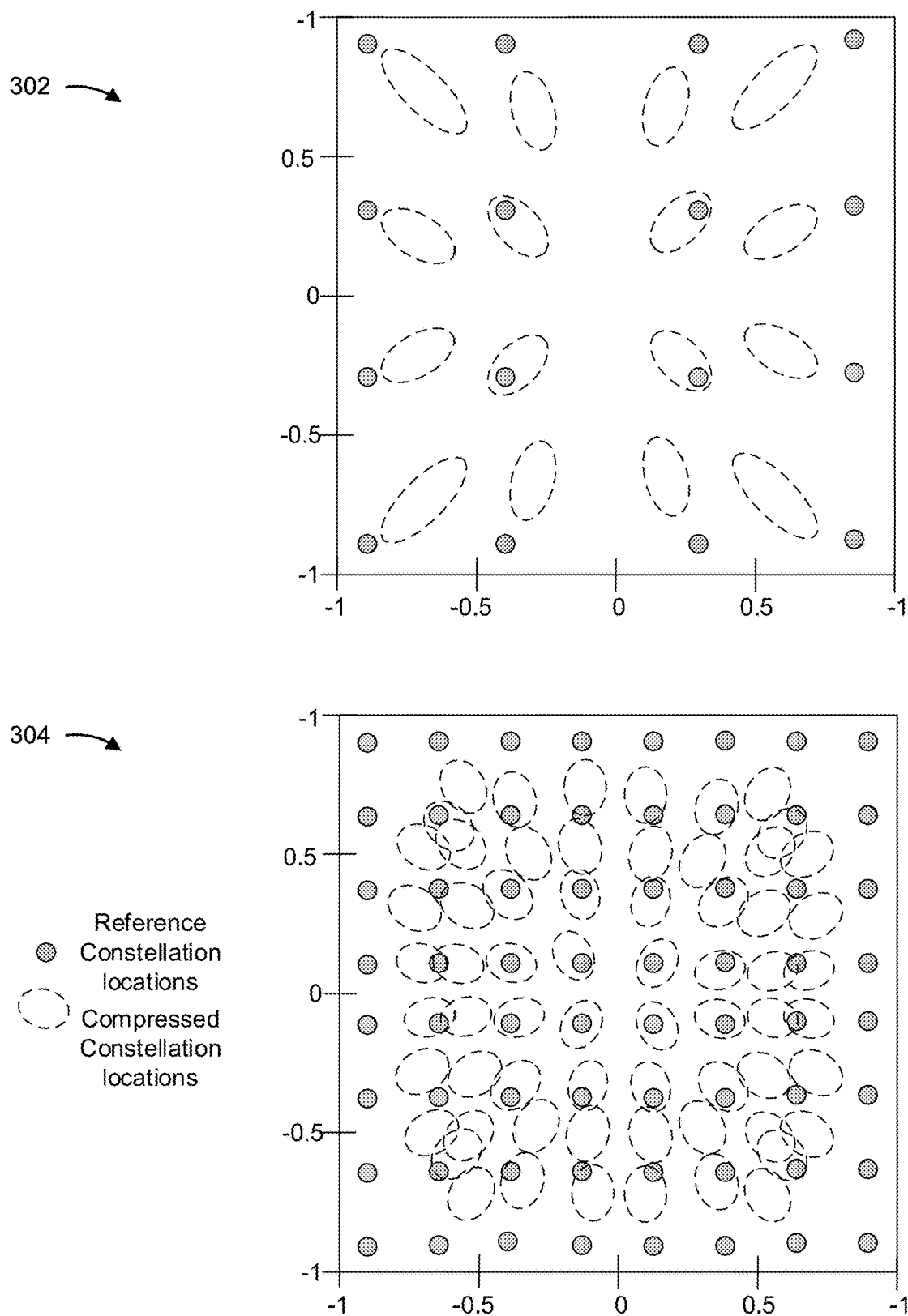
FIG. 3 is a diagram illustrating an example of a compressed constellation, in accordance with the present disclosure.

FIG. 3 is a diagram illustrating an example 300 of a compressed constellation, in accordance with the present disclosure. A constellation indicates locations (in a complex plane) of a modulation scheme that are associated with different values of a signal at sampling instances. Each of the different values are associated with one or more bits of information carried by the signal during the sampling instances. An angle from a (0,0) location of the constellation indicates a phase shift (e.g., from a reference phase) of a carrier wave and a distance from the (0,0) location indicates an amplitude or power of the signal.

A high order quadrature amplitude modulation (QAM) is associated with a constellation having a higher number of locations that are associated with different values of the signal at sampling instances. As shown in FIG. 3, a constellation diagram 302 indicates that 16 locations are associated with different values. The constellation diagram 302 includes a set of 16 reference constellation locations that are each associated with the different values. The constellation diagram 302 may represent a 16-QAM modulation scheme. A constellation diagram 304 indicates that 64 locations are associated with different values. The constellation diagram 304 includes a set of 64 reference constellation locations that are each associated with the different values. The constellation diagram 304 may represent a 64-QAM modulation scheme.

When a receiver device samples a signal, the receiver device plots a phase shift and amplitude of the signal and determines a location of the reference constellation that is associated with the signal. For example, the receiver device may match the signal to a nearest location of the reference constellation to demodulate the signal (e.g., to derive the one or more bits indicated by the signal). The 64-QAM modulation scheme may have a higher information density that the 16-QAM modulation (e.g., based on 64 different values being representable in a sampling instance); however, the 64-QAM modulation scheme may have a higher error rate based on incorrect matching of the signal to locations of the reference constellation. The incorrect matching may be based on constellation distortion caused by power amplifier compression in a transmitter device, which power amplifier compression may cause a non-linearity of a signal (e.g., power amplifier non-linearity).

Phase noise is a limiting factor in receiving high-modulation signals. As networks develop communications in higher bands (e.g., FR2 or higher), phase noise limitations may increase. For example, in FR2, a phase noise may limit a receiver device to receive communications with approximately 33 decibels of signal-to-noise ratio (SNR) after common phase error (CPE) correction using phase tracking reference signals (PT-RSs). In FR4 and FR5, phase noise may impose even higher limits to an SNR after CPE correction using PT-RSs. Based at least in part on these limits, networks may use single carrier waveforms for downlink communications.

Additionally, to communicate using higher bands, a transmitter device and/or a receiver device may have an increased density of antenna elements per antenna group based at least in part on distances between antenna elements being associated with a wavelength of a signal to be transmitted or received. Based at least in part on an increased density of antenna elements per antenna group, the transmitter device may have an increased number of power amplifiers. The power amplifiers may have lower power efficiency based at least in part on transmitting in a higher frequency band, which may consume additional power resources of the transmitter device. To improve power efficiency, the transmitter device may transmit with a power that is near saturation levels of the power amplifiers. However, transmitting with the power that is near saturation levels may cause power amplifier compression and/or power amplifier non-linearity. Power amplifier compression in single carrier waveforms may cause distortion to a constellation and/or noise. The distortion to the constellation and/or the noise may result in incorrect matching of signals to locations of a reference constellation. The incorrect matching may cause communication errors, which may consume power, communication, network, and communication resources to detect and/or correct (e.g., via retransmission schemes).

Returning to FIG. 3, constellation diagram 302 shows compressed constellation locations and reference constellation locations. The reference constellation may indicate locations of the signal before power amplification and the compressed locations may indicate locations of the signal after power amplifier compression. Additionally, the locations of the compressed constellation locations may have added noise (e.g., a delta of locations) based at least in part on the power amplifier compression.

As shown by constellation diagram 304, the compressed constellation locations for the 64-QAM modulation scheme may overlap with mismatched locations of the reference constellation locations. For example, locations of the compressed constellation locations may be compressed based at least in part on having reduced amplitudes, which may cause a signal with an intended high amplitude to match with a reference constellation location with a lower amplitude. Additionally, the locations of the compressed constellation locations may have added noise based at least in part on the power amplifier compression.

As indicated above, FIG. 3 is provided as an example. Other examples may differ from what is described with regard to FIG. 3.

In some aspects described herein, a transmitter device (e.g., a base station) may transmit an indication of a non-linearity model associated with one or more downlink communications. The non-linearity model (e.g., a power amplifier non-linearity model) may indicate a mapping of compressed constellation locations to reference constellation locations. A receiver device (e.g., a UE) may correct a center of mass distortion of received communications based at least in part on estimating a new distorted constellation using the non-linearity model. In this way, the receiver device may improve matching of signals to locations of a reference constellation, which may conserve power, communication, network, and communication resources that may have otherwise been consumed to detect and/or correct communication errors.

Figure 4:
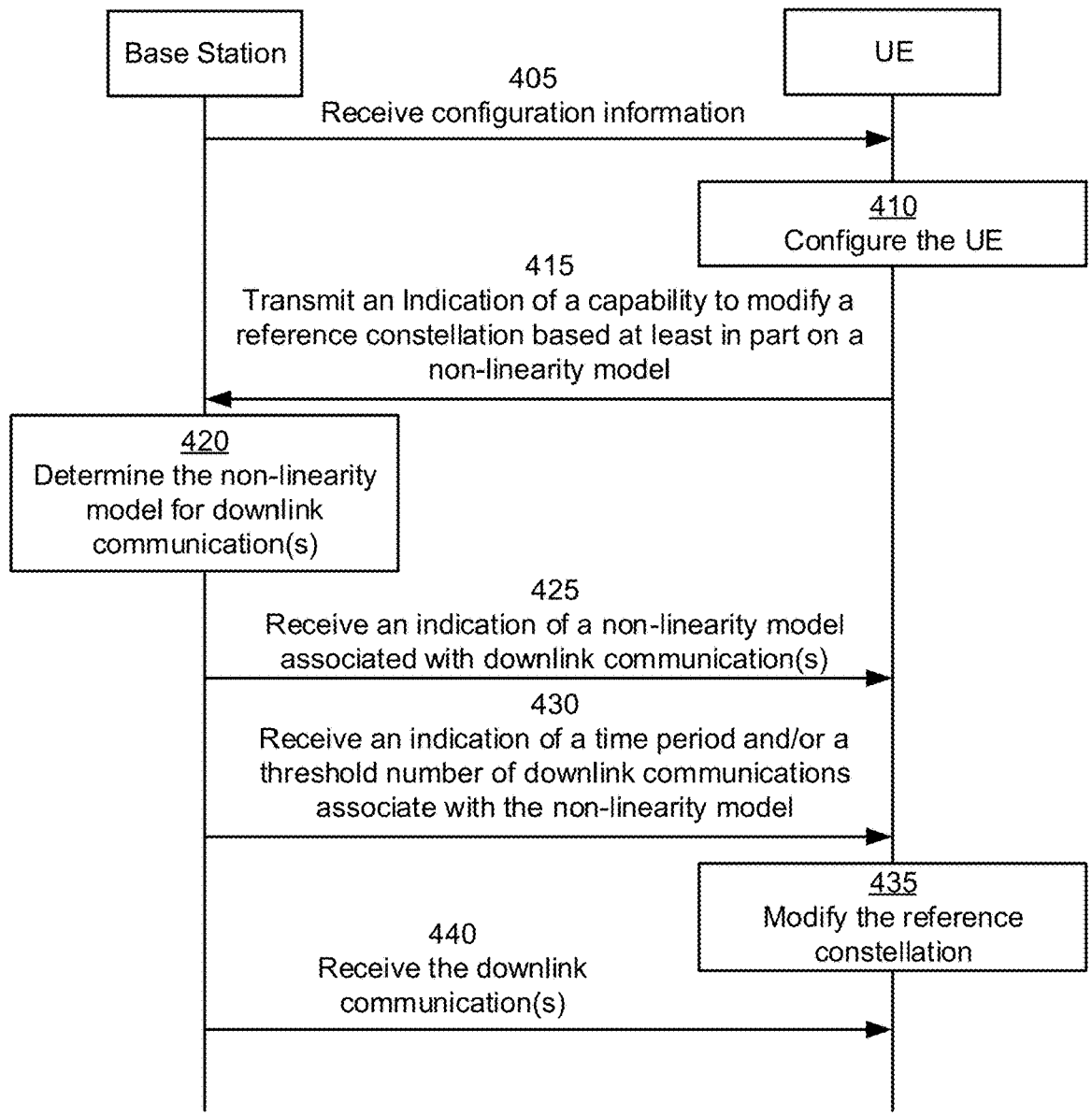
FIG. 4 is a diagram illustrating an example associated with signaling of a non-linearity model, in accordance with the present disclosure.

FIG. 4 is a diagram illustrating an example 400 associated with signaling of a non-linearity model, in accordance with the present disclosure. As shown in FIG. 4, a base station (e.g., base station 110) and a UE (e.g., UE 120) may communicate with one another.

As shown by reference number 405, the base station may transmit, and the UE may receive, configuration information. In some aspects, the UE may receive the configuration information via one or more of radio resource control (RRC) signaling, MAC control elements (MAC-CEs), and/or downlink control information (DCI), among other examples. In some aspects, the configuration information may include an indication of one or more configuration parameters (e.g., already known to the UE) for selection by the UE, and/or explicit configuration information for the UE to use to configure the UE, among other examples.

In some aspects, the configuration information may indicate that the UE is to transmit (e.g., to a base station) an indication that the UE has a capability to modify (e.g., supports modification of) a reference constellation based at least in part on a non-linearity model (e.g., a power amplifier non-linearity model) of the base station. In some aspects, the configuration information may indicate that the UE is to use the non-linearity model of the base station to map received signals to reference constellation locations and/or to modify (e.g., compress) the reference constellation locations. In some aspects, the configuration information may indicate that the UE is to receive the indication of the non-linearity power amplifier (NL PA) model via DCI, MAC signaling (e.g., MAC CEs), or RRC signaling, among other examples. In some aspects, the configuration information may indicate a time period and/or a threshold number of downlink communications associated with the non-linearity model.

As shown by reference number 410, the UE may configure itself based at least in part on the configuration information. In some aspects, the UE may be configured to perform one or more operations described herein based at least in part on the configuration information.

As shown by reference number 415, the UE may transmit, and the base station may receive, an indication of a UE capability to modify a reference constellation based at least in part on a non-linearity model and/or to map compressed constellation locations to the reference constellation locations based at least in part on the non-linearity model. In some aspects, the UE may transmit the indication as part of an RRC configuration process. For example, the UE may transmit the indication in connection with a UE capability report during or after an RRC configuration process. In some aspects, the UE capability to modify the reference constellation based at least in part on the non-linearity model and/or to map compressed constellation locations to the reference constellation locations may be based at least in part on a configuration of the UE, components of the UE, and/or availability of resources of the UE.

As shown by reference number 420, the base station may determine the non-linearity model (e.g., the power amplifier non-linearity model) for one or more downlink communications. In some aspects, the base station may determine the non-linearity based at least in part on measurement of non-linearity of transmitted signals, an expected non-linearity based at least in part on prior transmitted signals, and/or an expected non-linearity based at least in part on a power amplification level configured for transmission of signals.

As shown by reference number 425, the UE may receive, and the base station may transmit, an indication of the non-linearity model associated with the one or more downlink communications. In some aspects, the UE may receive the indication of the non-linearity model in DCI, MAC signaling (e.g., MAC-CEs), and/or RRC signaling, among other examples. For example, the UE may receive the indication in DCI of the non-linearity that indicates an entry in a data store (e.g., a table) of candidate non-linearity models. The candidate non-linearity models may be indicated within a communication protocol or previously received signaling (e.g., RRC signaling, MAC signaling, and/or configuration information, among other examples). In some aspects, the UE may receive the indication as an explicit indication of the non-linearity model via DCI, MAC signaling, and/or RRC signaling, among other examples. In some aspects, a type of signaling used to transmit the indication may be based at least in part on a compression level used by the base station.

In some aspects, the non-linearity model (e.g., the power amplifier non-linearity model) includes one or more kernels, such as odd-order memoryless kernels (e.g., $x*|x|^2$ and/or $x*|x|^4$, among other examples). In some aspects (e.g., when communicating with a relatively large bandwidth and/or with a relatively high SNR), the non-linearity model may include memory kernels, such as $x[n]*|x[n-k]|^M$ where k is a delay and M is an even integer. The indication of the non-linearity model may indicate a number of kernels and one or more coefficients for the non-linearity model.

The non-linearity model may provide a mapping from a first set of locations of a first modulation constellation after power amplification at a transmitter device to a second set of locations of a second modulation constellation before power amplification at the transmitter device. In some aspects, the non-linearity model may be an estimated non-linearity model.

As shown by reference number 430, the UE may receive, and the base station may transmit, an indication of a time period and/or a threshold number of downlink communications associated with the non-linearity model. In some aspects, the UE may receive the indication of the time period and/or the threshold number of downlink communications via DCI, RRC signaling, configuration information, and/or MAC signaling, among other examples. In some aspects, the indication of the time period and/or the threshold number of downlink communications may be transmitted with, or in a same communication as, another communications, such as the configuration information or the indication of the capability of the non-linearity model.

As shown by reference number 435, the UE may modify the reference constellation and/or map compressed constellation locations to the reference constellation locations based at least in part on the non-linearity model. For example, the UE may modify the reference constellation, for reception of the one or more downlink communications, based at least in part on the non-linearity model. The non-linearity model may be associated with the one or more downlink communications based at least in part on the one or more downlink communications being within a time period associated with the indication of the non-linearity model, or the one or more downlink communications being within a threshold number of downlink communications associated with the indication of the non-linearity model, among other examples. In some aspects, the UE may determine the time period and/or the threshold number of downlink communications based at least in part on a communication protocol and/or signaling from the base station, among other examples.

As shown by reference number 440, the UE may receive, and the base station may transmit, the one or more downlink communications. In some aspects, the one or more downlink communications may include a set of single-carrier waveform communications.

Based at least in part on the UE receiving the indication of the non-linearity model, the UE may correct a center of mass distortion of received communications based at least in part on estimating a new distorted constellation using the non-linearity model. In this way, the receiver device may improve matching of signals to locations of a reference constellation, which may conserve power, communication, network, and communication resources that may have otherwise been consumed to detect and/or correct communication errors.

As indicated above, FIG. 4 is provided as an example. Other examples may differ from what is described with regard to FIG. 4.

Figure 5:
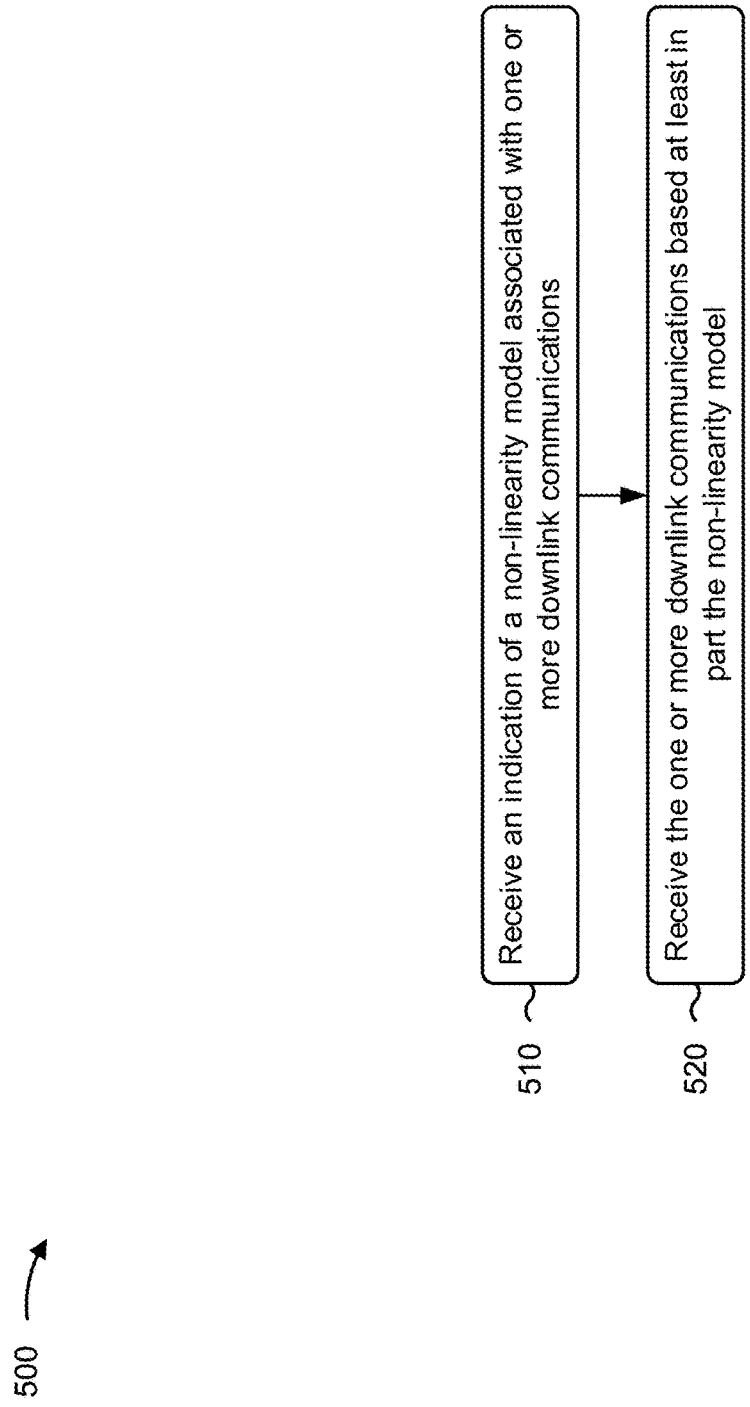
FIGS. 5 and 6 are diagrams illustrating example processes associated with signaling of a non-linearity model, in accordance with the present disclosure.

FIG. 5 is a diagram illustrating an example process 500 performed, for example, by a UE, in accordance with the present disclosure. Example process 500 is an example where the UE (e.g., UE 120) performs operations associated with signaling of a non-linearity model.

As shown in FIG. 5, in some aspects, process 500 may include receiving an indication of a non-linearity model associated with one or more downlink communications (block 510). For example, the UE (e.g., using communication manager 140 and/or reception component 702, depicted in FIG. 7) may receive an indication of a non-linearity model associated with one or more downlink communications, as described above.

As further shown in FIG. 5, in some aspects, process 500 may include receiving the one or more downlink communications based at least in part on the non-linearity model (block 520). For example, the UE (e.g., using communication manager 140 and/or reception component 702, depicted in FIG. 7) may receive the one or more downlink communications based at least in part on the non-linearity model, as described above.

Process 500 may include additional aspects, such as any single aspect or any combination of aspects described below and/or in connection with one or more other processes described elsewhere herein.

In a first aspect, the one or more downlink communications comprise a set of single-carrier waveform communications.

In a second aspect, process 500 includes modifying a reference constellation, for reception of the one or more downlink communications, based at least in part on the non-linearity model.

In a third aspect, the non-linearity model is associated with the one or more downlink communications based at least in part on one or more of the one or more downlink communications being within a time period associated with the indication of the non-linearity model, or the one or more downlink communications being within a threshold number of downlink communications associated with the indication of the non-linearity model.

In a fourth aspect, process 500 includes receiving an indication of one or more of the time period or the threshold number of downlink communications, or determining, based at least in part on a communication protocol, one or more of the time period or the threshold number of downlink communications.

In a fifth aspect, the indication of the non-linearity model indicates a number of kernels and one or more coefficients for the non-linearity model.

In a sixth aspect, the non-linearity model provides a mapping from a first set of locations of a first modulation constellation after power amplification at a transmitter device to a second set of locations of a second modulation constellation before power amplification at the transmitter device.

In a seventh aspect, receiving the indication of the non-linearity model comprises receiving the indication of the non-linearity model via one or more of downlinking control information, medium access control signaling, or radio resource control signaling.

In an eighth aspect, the indication of the non-linearity model indicates the non-linearity model from a set of candidate non-linearity models configured via one or more of a communication protocol, radio resource control signaling, or medium access control signaling.

In a ninth aspect, a type of signaling used to receive the indication of the non-linearity model is based at least in part on a compression level used by a transmitting device.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
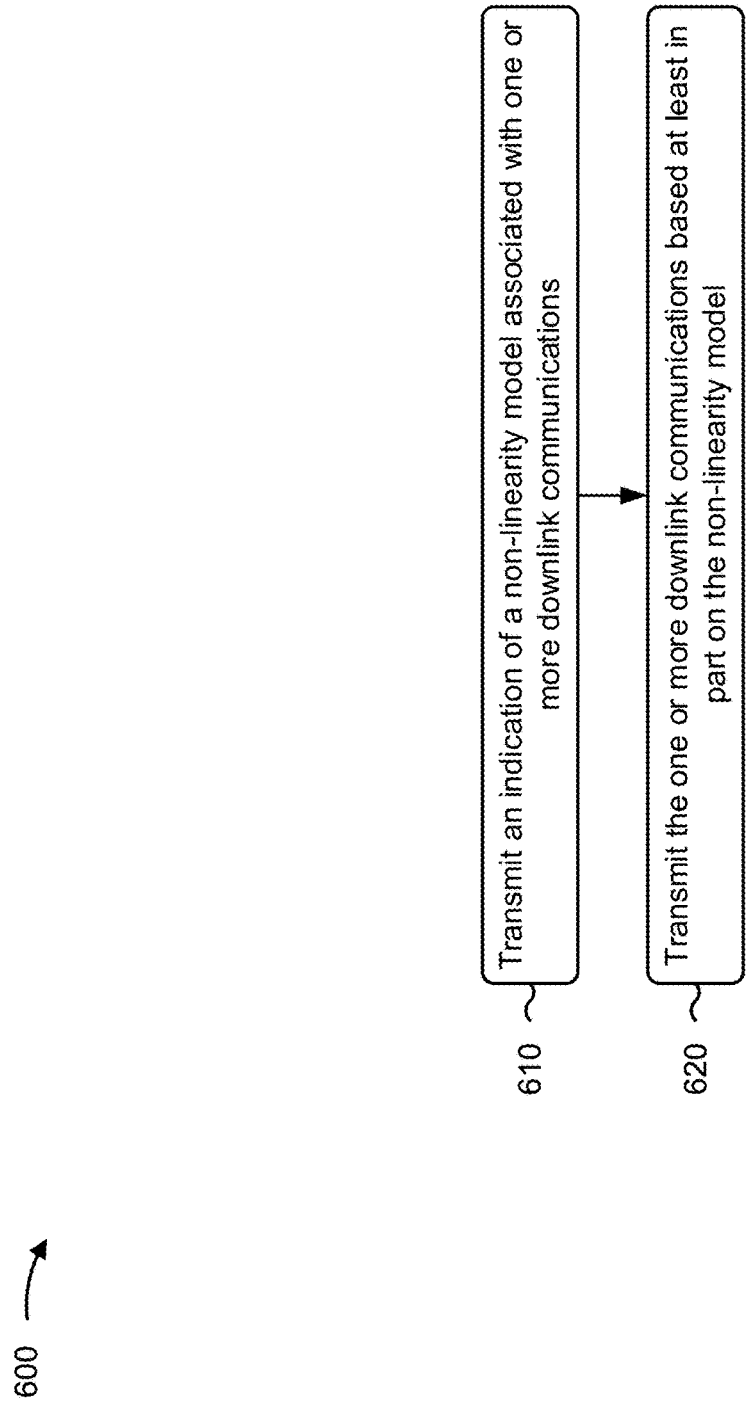

FIG. 6 is a diagram illustrating an example process 600 performed, for example, by a base station, in accordance with the present disclosure. Example process 600 is an example where the base station (e.g., base station 110) performs operations associated with signaling of a non-linearity model.

As shown in FIG. 6, in some aspects, process 600 may include transmitting an indication of a non-linearity model associated with one or more downlink communications (block 610). For example, the base station (e.g., using communication manager 150 and/or transmission component 804, depicted in FIG. 8) may transmit an indication of a non-linearity model associated with one or more downlink communications, as described above.

As further shown in FIG. 6, in some aspects, process 600 may include transmitting the one or more downlink communications based at least in part on the non-linearity model (block 620). For example, the base station (e.g., using communication manager 150 and/or transmission component 804, depicted in FIG. 4) may transmit the one or more downlink communications based at least in part on the non-linearity model, as described above.

Process 600 may include additional aspects, such as any single aspect or any combination of aspects described below and/or in connection with one or more other processes described elsewhere herein.

In a first aspect, the one or more downlink communications comprise a set of single-carrier waveform communications.

In a second aspect, process 600 includes determining the non-linearity model based at least in part on a compression, from power amplification, of signaling of the one or more downlink communications.

In a third aspect, the non-linearity model is associated with the one or more downlink communications based at least in part on one or more of the one or more downlink communications being within a time period associated with the indication of the non-linearity model, or the one or more downlink communications being within a threshold number of downlink communications associated with the indication of the non-linearity model.

In a fourth aspect, process 600 includes transmitting an indication of one or more of the time period or the threshold number of downlink communications.

In a fifth aspect, the indication of the non-linearity model indicates a number of kernels and one or more coefficients for the non-linearity model.

In a sixth aspect, the non-linearity model provides a mapping from a first set of locations of a first modulation constellation after power amplification at the base station to a second set of locations of a second modulation constellation before power amplification at the base station.

In a seventh aspect, transmitting the indication of the non-linearity model comprises transmitting the indication of the non-linearity model via one or more of downlinking control information, medium access control signaling, or radio resource control signaling.

In an eighth aspect, the indication of the non-linearity model indicates the non-linearity model from a set of candidate non-linearity models configured via one or more of a communication protocol, radio resource control signaling, or medium access control signaling.

In a ninth aspect, a type of signaling used to transmit the indication of the non-linearity model is based at least in part on a compression level used by the base station.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
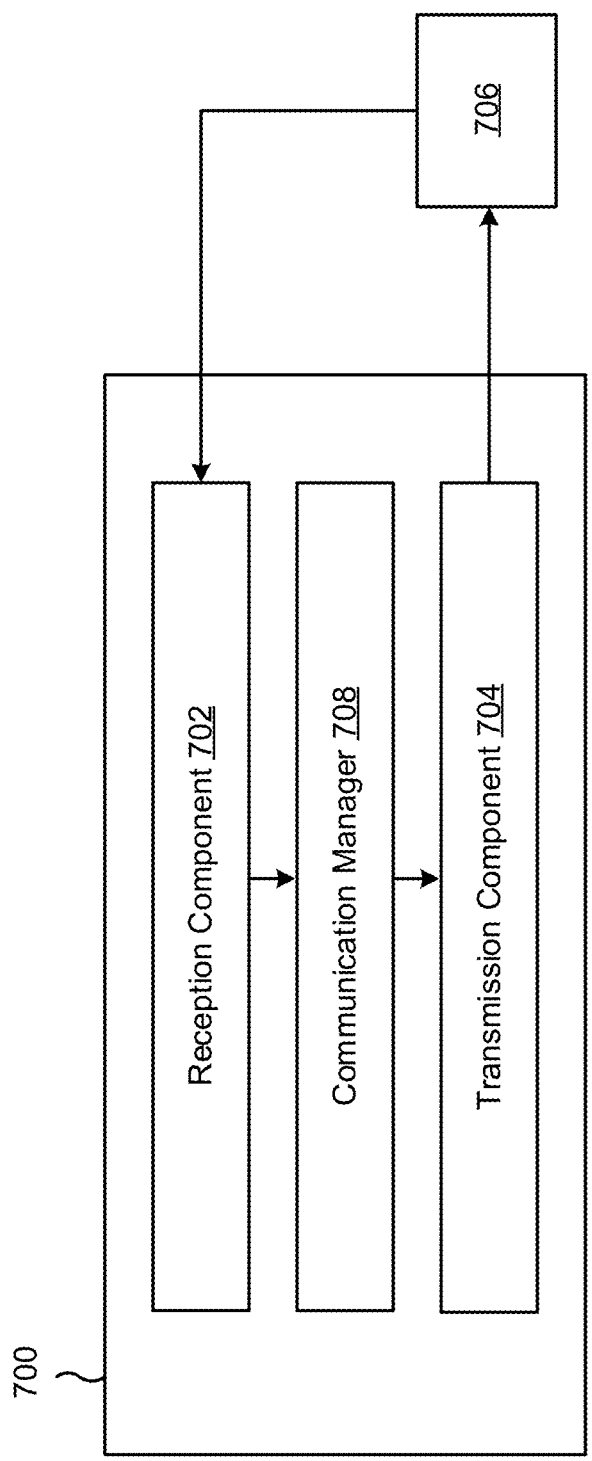
FIGS. 7 and 8 are block diagrams of example apparatuses for wireless communication, in accordance with the present disclosure.

FIG. 7 is a block diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include the communication manager 708 (e.g., communication manager 140 of FIGS. 1 and 2).

In some aspects, the apparatus 700 may be configured to perform one or more operations described herein in connection with FIG. 4. Additionally, or alternatively, the apparatus 700 may be configured to perform one or more processes described herein, such as process 500 of FIG. 5. In some aspects, the apparatus 700 and/or one or more components shown in FIG. 7 may include one or more components of the UE described above in connection with FIG. 2. Additionally, or alternatively, one or more components shown in FIG. 7 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the UE described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the UE described above in connection with FIG. 2. In some aspects, the transmission component 704 may be co-located with the reception component 702 in a transceiver.

The reception component 702 may receive an indication of a non-linearity model associated with one or more downlink communications. The reception component 702 may receive the one or more downlink communications based at least in part on the non-linearity model.

The communication manager 708 may modify a reference constellation, for reception of the one or more downlink communications, based at least in part on the non-linearity model.

The reception component 702 may receive an indication of one or more of the time period or the threshold number of downlink communications.

The communication manager 708 may determine, based at least in part on a communication protocol, one or more of the time period or the threshold number of downlink communications.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Figure 8:
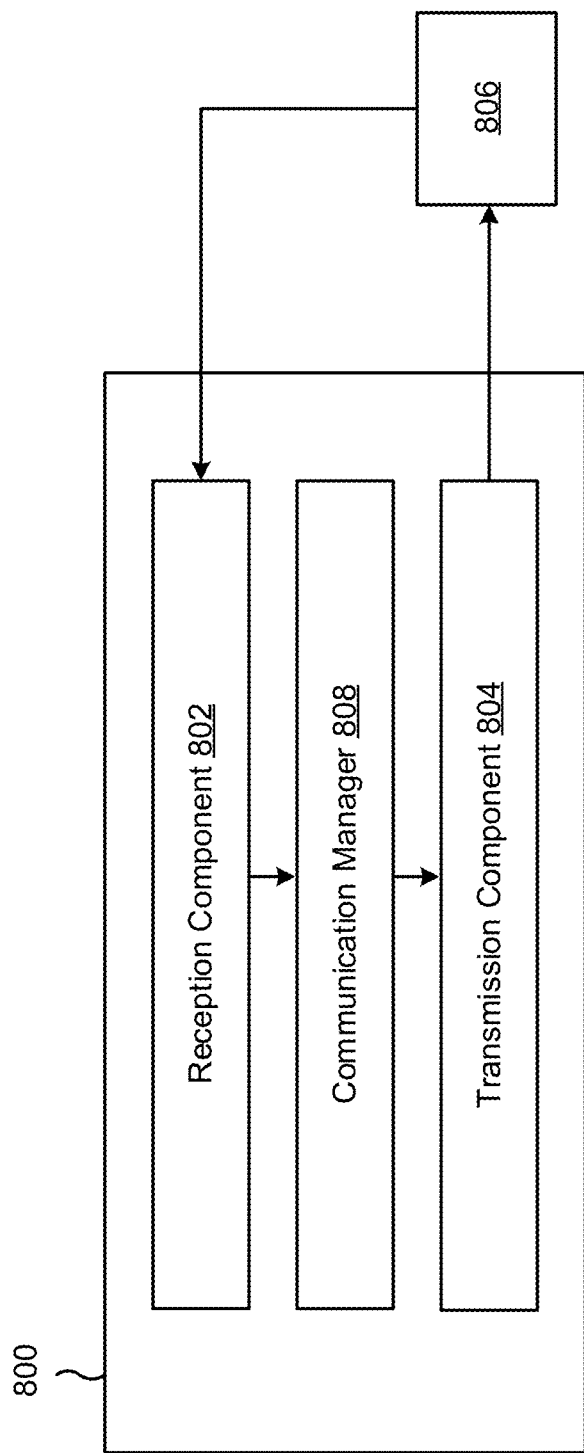

FIG. 8 is a block diagram of an example apparatus 800 for wireless communication. The apparatus 800 may be a base station, or a base station may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include a communication manager 808 (e.g., the communication manager 150 of FIGS. 1 and 2).

In some aspects, the apparatus 800 may be configured to perform one or more operations described herein in connection with FIG. 4. Additionally, or alternatively, the apparatus 800 may be configured to perform one or more processes described herein, such as process 600 of FIG. 6, or a combination thereof. In some aspects, the apparatus 800 and/or one or more components shown in FIG. 8 may include one or more components of the base station described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the base station described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the base station described above in connection with FIG. 2. In some aspects, the transmission component 804 may be co-located with the reception component 802 in a transceiver.

The transmission component 804 may transmit an indication of a non-linearity model associated with one or more downlink communications. The transmission component 804 may transmit the one or more downlink communications based at least in part on the non-linearity model.

The communication manager 808 may determine the non-linearity model based at least in part on a compression, from power amplification, of signaling of the one or more downlink communications.

The transmission component 804 may transmit an indication of one or more of the time period or the threshold number of downlink communications.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a user equipment (UE), comprising: receiving an indication of a non-linearity model associated with one or more downlink communications; and receiving the one or more downlink communications based at least in part on the non-linearity model.

Aspect 2: The method of Aspect 1, wherein the one or more downlink communications comprise a set of single-carrier waveform communications.

Aspect 3: The method of any of Aspects 1-2, further comprising: modifying a reference constellation, for reception of the one or more downlink communications, based at least in part on the non-linearity model.

Aspect 4: The method of any of Aspects 1-3, wherein the non-linearity model is associated with the one or more downlink communications based at least in part on one or more of: the one or more downlink communications being within a time period associated with the indication of the non-linearity model, or the one or more downlink communications being within a threshold number of downlink communications associated with the indication of the non-linearity model.

Aspect 5: The method of Aspect 4, further comprising: receiving an indication of one or more of the time period or the threshold number of downlink communications; or determining, based at least in part on a communication protocol, one or more of the time period or the threshold number of downlink communications.

Aspect 6: The method of any of Aspects 1-5, wherein the indication of the non-linearity model indicates a number of kernels and one or more coefficients for the non-linearity model.

Aspect 7: The method of any of Aspects 1-6, wherein the non-linearity model provides a mapping from a first set of locations of a first modulation constellation after power amplification at a transmitter device to a second set of locations of a second modulation constellation before power amplification at the transmitter device.

Aspect 8: The method of any of Aspects 1-7, wherein receiving the indication of the non-linearity model comprises receiving the indication of the non-linearity model via one or more of: downlink control information, medium access control signaling, or radio resource control signaling.

Aspect 9: The method of Aspect 8, wherein the indication of the non-linearity model indicates the non-linearity model from a set of candidate non-linearity models configured via one or more of: a communication protocol, radio resource control signaling, or medium access control signaling.

Aspect 10: The method of any of Aspects 1-9, wherein a type of signaling used to receive the indication of the non-linearity model is based at least in part on a compression level used by a transmitting device.

Aspect 11: A method of wireless communication performed by a base station, comprising: transmitting an indication of a non-linearity model associated with one or more downlink communications; and transmitting the one or more downlink communications based at least in part on the non-linearity model.

Aspect 12: The method of Aspect 11, wherein the one or more downlink communications comprise a set of single-carrier waveform communications.

Aspect 13: The method of any of Aspects 11-12, further comprising: determining the non-linearity model based at least in part on a compression, from power amplification, of signaling of the one or more downlink communications.

Aspect 14: The method of any of Aspects 11-13, wherein the non-linearity model is associated with the one or more downlink communications based at least in part on one or more of: the one or more downlink communications being within a time period associated with the indication of the non-linearity model, or the one or more downlink communications being within a threshold number of downlink communications associated with the indication of the non-linearity model.

Aspect 15: The method of Aspect 14, further comprising: transmitting an indication of one or more of the time period or the threshold number of downlink communications.

Aspect 16: The method of any of Aspects 11-15, wherein the indication of the non-linearity model indicates a number of kernels and one or more coefficients for the non-linearity model.

Aspect 17: The method of any of Aspects 11-16, wherein the non-linearity model provides a mapping from a first set of locations of a first modulation constellation after power amplification at the base station to a second set of locations of a second modulation constellation before power amplification at the base station.

Aspect 18: The method of any of Aspects 11-17, wherein transmitting the indication of the non-linearity model comprises transmitting the indication of the non-linearity model via one or more of: downlink control information, medium access control signaling, or radio resource control signaling.

Aspect 19: The method of Aspect 18, wherein the indication of the non-linearity model indicates the non-linearity model from a set of candidate non-linearity models configured via one or more of: a communication protocol, radio resource control signaling, or medium access control signaling.

Aspect 20: The method of any of Aspects 11-19, wherein a type of signaling used to transmit the indication of the non-linearity model is based at least in part on a compression level used by the base station.

Aspect 21: An apparatus for wireless communication at a device, comprising a processor; memory coupled with the processor; and instructions stored in the memory and executable by the processor to cause the apparatus to perform the method of one or more of Aspects 1-20.

Aspect 22: A device for wireless communication, comprising a memory and one or more processors coupled to the memory, the one or more processors configured to perform the method of one or more of Aspects 1-20.

Aspect 23: An apparatus for wireless communication, comprising at least one means for performing the method of one or more of Aspects 1-20.

Aspect 24: A non-transitory computer-readable medium storing code for wireless communication, the code comprising instructions executable by a processor to perform the method of one or more of Aspects 1-20.

Aspect 25: A non-transitory computer-readable medium storing a set of instructions for wireless communication, the set of instructions comprising one or more instructions that, when executed by one or more processors of a device, cause the device to perform the method of one or more of Aspects 1-20.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors, coupled to the memory, configured to:
      receive configuration information indicating that the UE is to demodulate one or more downlink communications using a power amplifier non-linearity model determined by a network entity;
      receive an indication of the power amplifier non-linearity model determined by the network entity based at least in part on the configuration information; and
      demodulate the one or more downlink communications based at least in part on the configuration information and the indication of the power amplifier non-linearity model.

2. The UE of claim 1, wherein the one or more downlink communications comprise a set of single-carrier waveform communications.

3. The UE of claim 1, wherein the one or more processors are further configured to:
   modify a reference constellation, for demodulation of the one or more downlink communications, based at least in part on the power amplifier non-linearity model.

4. The UE of claim 1, wherein the power amplifier non-linearity model is associated with the one or more downlink communications based at least in part on one or more of:
   the one or more downlink communications being within a time period associated with the indication of the power amplifier non-linearity model, or
   the one or more downlink communications being within a threshold number of downlink communications associated with the indication of the power amplifier non-linearity model.

5. The UE of claim 4, wherein the one or more processors are further configured to:
   receive an indication of one or more of the time period or the threshold number of downlink communications; or
   determine, based at least in part on a communication protocol, one or more of the time period or the threshold number of downlink communications.

6. The UE of claim 1, wherein the indication of the power amplifier non-linearity model indicates a number of kernels and one or more coefficients for the power amplifier non-linearity model.

7. The UE of claim 1, wherein the power amplifier non-linearity model provides a mapping from a first set of locations of a first modulation constellation after power amplification at a transmitter device to a second set of locations of a second modulation constellation before power amplification at the transmitter device.

8. The UE of claim 1, wherein the one or more processors, to receive the indication of the power amplifier non-linearity model, are configured to receive the indication of the power amplifier non-linearity model via one or more of:
   downlink control information,
   medium access control signaling, or
   radio resource control signaling.

9. The UE of claim 8, wherein the indication of the power amplifier non-linearity model indicates the power amplifier non-linearity model from a set of candidate power amplifier non-linearity models configured via one or more of:
   a communication protocol,
   radio resource control signaling, or medium access control signaling.

10. The UE of claim 1, wherein a type of signaling used to receive the indication of the power amplifier non-linearity model is based at least in part on a compression level used by a transmitting device.

11. A network entity for wireless communication, comprising:
a memory; and
one or more processors, coupled to the memory, configured to:
transmit configuration information indicating that a user equipment (UE) is to demodulate one or more downlink communications using a power amplifier non-linearity model determined by the network entity;
transmit an indication of the power amplifier non-linearity model determined by the network entity based at least in part on the transmission of the configuration information; and
transmit the one or more downlink communications based at least in part on the transmission of the configuration information and the indication of the power amplifier non-linearity model.

12. The network entity of claim 11, wherein the one or more downlink communications comprise a set of single-carrier waveform communications.

13. The network entity of claim 11, wherein the one or more processors are further configured to:
determine the power amplifier non-linearity model based at least in part on a compression, from power amplification, of signaling of the one or more downlink communications.

14. The network entity of claim 11, wherein the power amplifier non-linearity model is associated with the one or more downlink communications based at least in part on one or more of:
the one or more downlink communications being within a time period associated with the indication of the power amplifier non-linearity model, or
the one or more downlink communications being within a threshold number of downlink communications associated with the indication of the power amplifier non-linearity model.

15. The network entity of claim 14, wherein the one or more processors are further configured to:
transmit an indication of one or more of the time period or the threshold number of downlink communications.

16. The network entity of claim 11, wherein the indication of the power amplifier non-linearity model indicates a number of kernels and one or more coefficients for the power amplifier non-linearity model.

17. The network entity of claim 11, wherein the power amplifier non-linearity model provides a mapping from a first set of locations of a first modulation constellation after power amplification at the network entity to a second set of locations of a second modulation constellation before power amplification at the network entity.

18. The network entity of claim 11, wherein the one or more processors, to transmit the indication of the power amplifier non-linearity model, are configured to transmit the indication of the power amplifier non-linearity model via one or more of:
downlink control information,
medium access control signaling, or
radio resource control signaling.

19. The network entity of claim 18, wherein the indication of the power amplifier non-linearity model indicates the power amplifier non-linearity model from a set of candidate power amplifier non-linearity models configured via one or more of:
a communication protocol,
radio resource control signaling, or
medium access control signaling.

20. The network entity of claim 11, wherein a type of signaling used to transmit the indication of the power amplifier non-linearity model is based at least in part on a compression level used by the network entity.

21. A method of wireless communication performed by a user equipment (UE), comprising:
receiving configuration information indicating that the UE is to demodulate one or more downlink communications using a power amplifier non-linearity model determined by a network entity;
receiving an indication of the power amplifier non-linearity model determined by the network entity based at least in part on the configuration information; and
demodulating the one or more downlink communications based at least in part on the configuration information and the indication of the power amplifier non-linearity model.

22. The method of claim 21, further comprising:
modifying a reference constellation, for reception of the one or more downlink communications, based at least in part on the power amplifier non-linearity model.

23. The method of claim 21, wherein the indication of the power amplifier non-linearity model indicates a number of kernels and one or more coefficients for the power amplifier non-linearity model.

24. The method of claim 21, wherein the power amplifier non-linearity model provides a mapping from a first set of locations of a first modulation constellation after power amplification at a transmitter device to a second set of locations of a second modulation constellation before power amplification at the transmitter device.

25. The method of claim 21, wherein a type of signaling used to receive the indication of the power amplifier non-linearity model is based at least in part on a compression level used by a transmitting device.

26. A method of wireless communication performed by a network entity, comprising:
transmitting configuration information indicating that a user equipment (UE) is to demodulate one or more downlink communications using a power amplifier non-linearity model determined by the network entity;
transmitting an indication of the power amplifier non-linearity model determined by the network entity based at least in part on the transmission of the configuration information; and
transmitting the one or more downlink communications based at least in part on the transmission of the configuration information and the indication of the power amplifier non-linearity model.

27. The method of claim 26, wherein the one or more downlink communications comprise a set of single-carrier waveform communications.

28. The method of claim 26, wherein the indication of the power amplifier non-linearity model indicates a number of kernels and one or more coefficients for the power amplifier non-linearity model.

29. The method of claim 26, wherein the power amplifier non-linearity model provides a mapping from a first set of locations of a first modulation constellation after power amplification at the network entity to a second set of locations of a second modulation constellation before power amplification at the network entity.

30. The method of claim 26, wherein a type of signaling used to transmit the indication of the power amplifier non-linearity model is based at least in part on a compression level used by the network entity.

\* \* \* \* \*